March 1, 1966
W. C. LAPPLE
3,238,016
DEFLUORINATION OF PHOSPHATIC COMPOUNDS
Filed June 20, 1962
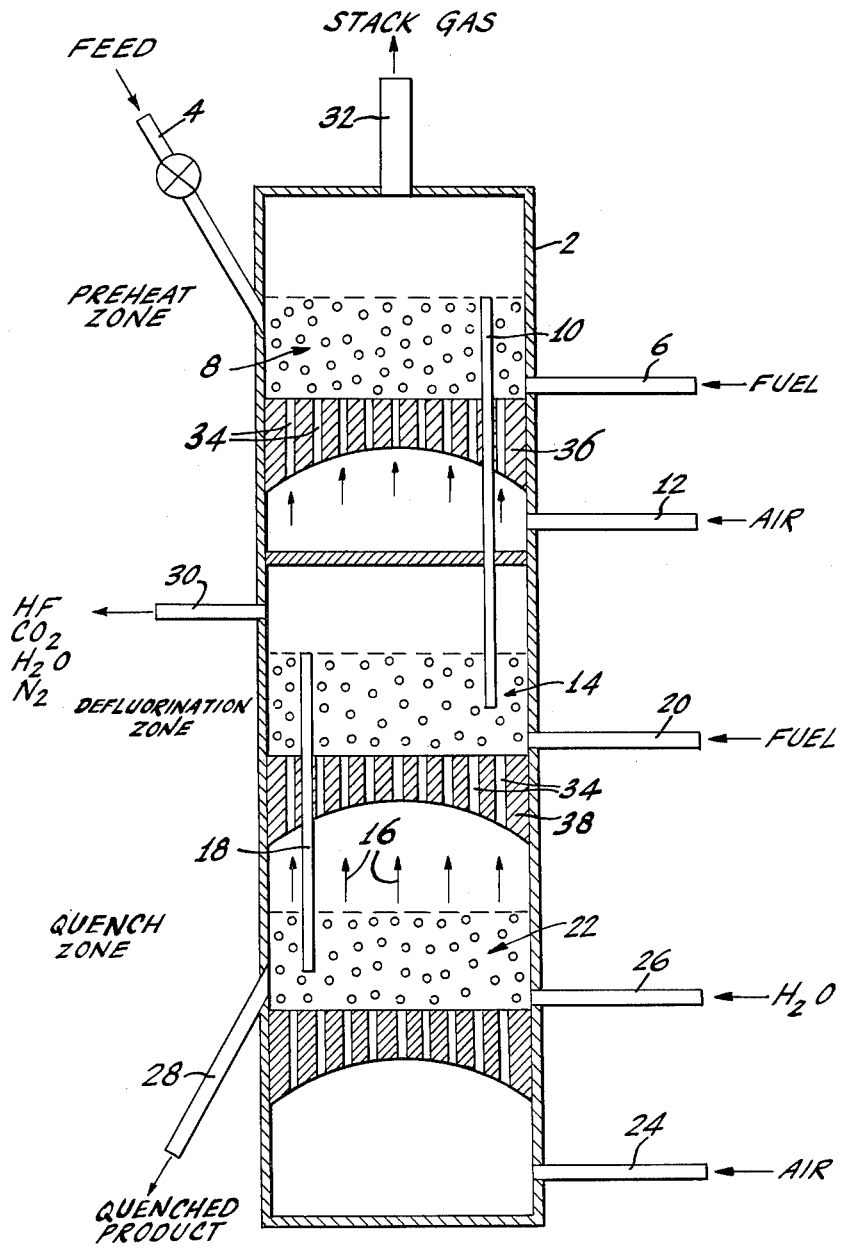
INVENTOR.
WALTER C. LAPPLE
BY
ATTORNEYS United States Patent Office 3,238,016
Patented Mar. 1, 1966

3,238,016
DEFLUORINATION OF PHOSPHATIC
COMPOUNDS
Walter C. Lapple, Mountainside, N.J., assignor to FMC
Corporation, New York, N.Y., a corporation of
Delaware
Filed June 20, 1962, Ser. No. 203,893
9 Claims. (Cl. 23—108)

This invention relates to the defluorination of phosphatic compounds containing molecularly bound fluorides, such as $3Ca_3(PO_4)_2 \cdot CaF_2$.

In my co-pending application, Serial No. 203,784, filed on June 20, 962, an improved process is taught for the direct production of phosphorus pentoxide ($P_2O_5$) from a phosphatic ore in a one-step process; the phosphate ore is reduced to elemental phosphorus and is subsequently oxidized to $P_2O_5$ within the same reaction zone in the absence of a barrier separating the oxidation and reduction zones. To make this process workable with ores containing substantial quantities of fluorine, it is necessary to defluorinate such ores, in order to prevent sintering of the ore particles at the high temperatures necessary to recover the phosphorus.

With phosphatic ores containing relatively high proportions of silica, i.e., above 8%, serious difficulties are encountered in defluorination, due, in large measure, to the fact that the phosphatic ores sinter at temperatures required to effect defluorination. One example of such phosphatic ores is the phosphatic shale obtained from the Western portion of the United States containing 25.15% $P_2O_5$, 36.55% CaO, 23.68% $SiO_2$ and 2.47% fluorine which sinters at temperatures as low as 1060° C. Since temperatures at or above this fusion temperature are necessary to effect defluorination, ordinary defluorination processes generally convert such high silica feeds into large sintered agglomerates which are useless in my new phosphorus recovery method, and which are generally undesirable for other uses. As a result, there has been a need for a process which can be employed in defluorinating phosphatic ores containing high silica contents without sintering of the phosphatic feed.

It is an object of the present invention to defluorinate a phosphatic ore containing molecularly bound fluorides, in which the silica content of the ore is above about 8% and to produce discrete particles of phosphatic ore without forming sintered masses within the defluorinator.

This and other objects will be apparent from the present disclosure.

It has now been found that phosphatic ores having high silica contents can be defluorinated in a heating zone to yield a product having acceptably low fluoride levels without the formation of a sintered phosphatic residue by (a) subjecting crushed phosphatic ore to a desliming operation to remove a fines fraction containing the colloidal particles often present as impurities in such ores and poor in phosphate values, (b) mixing the deslimed phosphatic ore with $SiO_2$ and/or crushed lime to produce a mixture having free $CaO/SiO_2$ mole ratios of above about 1.70:1 and preferably above about 2.0:1, (c) compacting the mixture to form particles, (d) heating the compacted particles in a heating zone in the presence of steam at temperatures of from about 1050° C. to 1450° C. and (e) recovering discrete phosphatic particles substantially free of fluoride.

The free $CaO/SiO_2$ ratio is defined as the mole ratio of calcium (as CaO) present, excluding calcium in the form of $Ca_3(PO_4)_2$ to $SiO_2$ present in the phosphatic ore sample.

The inclusion of small amounts of soda ash, e.g., 3 to 8%, in the compacted particles is desirable to increase the ease of defluorination and to increase the citrate solubility of the treated phophate ore.

By means of the present process, defluorination at temperatures of about 1300° C. and even as high as about 1500° C. can be carried out without sintering. This is completely unexpected in view of the low sintering temperatures (1060° C. to 1100° C.) of phosphatic ores having silica contents above about 8%.

It has been found that the degree of stickiness or tackiness which the phosphatic ore exhibits during defluorination depends in great measure upon the mole ratio of free $CaO/SiO_2$ which is present in the feed mixture, as well as the amount of colloidal particles containing low fusion temperature components, e.g., clay and aluminum, which are present in the phosphatic feed. The colloidal particles are removed during the desliming operation and the free $CaO/SiO_2$ ratio is adjusted by the addition of lime and/or sand in the proper proportions. The calcium values can be supplied most conveniently by the addition of calcium silicate slag from a reduction furnace if the phosphate is being processed to obtain elemental phosphorus, since this free $CaO/SiO_2$ mole ratio in the slag has been increased by the elimination of $P_2O_5$ previously combined with much of the CaO.

In carrying out the present process, the heating zone can comprise a static kiln, a rotary kiln or a fluid bed. The fluid bed is preferred because the temperature of the bed is uniform and can be more accurately controlled, compared with a kiln. Further, the fluid bed is ideal for heating discrete pellets of small size in a continuous process.

If a fluid bed is employed for defluorination, it is generally preferred in commercial defluorinating units to have at least two separate stages. In the first stage, a fluid bed is used to preheat the ore. The overflow from this fluid bed is used as preheated ore in a second fluid bed in which defluorination is accomplished. If a static or rotary kiln is employed, the kiln can inherently have a preheating zone and a defluorinating zone by maintaining a temperature gradient from one end of the kilm to the other end.

In the preferred mode of operation, phosphate ore is ground to about —10 mesh. The —10 mesh phosphate ore is initially subjected to a desliming stage by repeated water washings of the phosphate feed in order to classify phosphate-containing particles from smaller colloidal particles containing low fusion point impurities. The slimes or colloidal particles can be removed by simple decantation. The desliming operation can provide a qualitative separation because the phosphate values are generally found in the larger-sized particles, while low fusion point impurities are found in the smaller or colloidal particles of the mixture. It is essential to remove 90% or more of the colloidal particles (—5 microns), but other fines, up to about 50 microns, can be removed along with the colloidal particles.

The deslimed phosphate feed is dried and pulverized to about —100 mesh. The crushed ore is mixed with silica and/or lime in a blender. In the blending stage, the free $CaO/SiO_2$ mole ratio of the mixture is adjusted to above about 1.70:1. This free $CaO/SiO_2$ mole ratio excludes calcium (as CaO) which is bound as calcium phosphate —$Ca_3(PO_4)_2$— and is independent of the total $CaO/SiO_2$ mole ratio which is present in the mixture. It is preferred that the calcium values be added in the form of recycled slag (calcium silicate) from a phosphorus-producing furnace, if the phosphate is being processed to recover $P_4$ or $P_2O_5$. When recycled slag is used to supply the calcium values, free $CaO/SiO_2$ mole ratios of about 1.70:1 can be employed in the defluorinating stage without any sintering. However, when lime is added to the blender, it is preferred that the free $CaO/SiO_2$ mole ratio be at or above about 2.0:1 in order to avoid even minor sintering.

The homogeneous mass from the blender is then compacted and screened to give about a −6 +20 mesh granular product. The exact size of these particles depends upon the requirements of the fluid bed; any size particles which can be supported and heated within the fluidized bed can be employed. The compacted particles are then introduced into a fluid bed and are preheated to a temperature of from about 800° C. to about 1000° C. The maximum temperature of the fluidized bed preheater is adjusted so that no fluoride is evolved during the preheating stage. Since fluoride evolution commences at about 1050° C., the fluidized bed preheater is generally maintained somewhat below this temperature.

A preheating stage is employed in order to obtain a hard, compacted particle which is dust free. Dust-free particles are desirable during the defluorinating stage so that the hydrogen fluoride which is liberated can be readily collected free of undesirable dust particles. The preheating stage is also advantageous in that it reduces the amount of heating gas which must be added to the defluorinating stage. As a result of the reduction in the volume of heating gas which must be introduced in the defluorinating stage, a more concentrated hydrogen fluoride effluent gas stream is obtained. This is advantageous because separation and recovery of hydrogen fluoride from a gas stream can be carried out more readily with higher concentration of hydrogen fluoride.

The preheated, dust-free, compacted particles overflow into a second fluid bed which is heated to a temperature above 1050° C. The defluorinating fluidized bed can operate at temperatures from just above 1050° C. to about 1450° C., with temperatures of about 1300° C. being preferred. The exact temperature of defluorination depends upon the total $CaO/SiO_2$ mole ratio. The total $CaO/SiO_2$ mole ratio is defined as the mole ratio of total calcium (as CaO) to $SiO_2$ present in the feed. In general, the higher this ratio, the higher will be the temperature required for defluorination. In the fluid bed, steam is introduced in sufficient amounts to convert the calcium fluoride ($CaF_2$) to hydrogen fluoride according to the following equation.

EQUATION 1

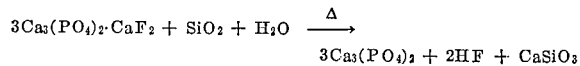

$$3Ca_3(PO_4)_2 \cdot CaF_2 + SiO_2 + H_2O \xrightarrow{\Delta} 3Ca_3(PO_4)_2 + 2HF + CaSiO_3$$

The hydrogen fluoride is removed as a gaseous stream overhead, along with the fluidizing gas, while dust-free, compacted phosphate particles are removed from the fluid bed.

The compacted particles removed from the defluorination chamber are quenched with air in order to preheat the combustion air employed in the defluorination zone. It is sometimes desirable to add water to the cooling stage in order that an optimum concentration of steam be introduced into the defluorinating zone.

The cooled, fluorine-free, compacted phosphate particle thus obtained has been found to have high citrate solubility with respect to its phosphate values. This is extremely important where the phosphate values are to be utilized for producing fertilizers since citrate solubility is a measure of the availability of the phosphate as a plant food. The compacted phosphate particles thus treated also have been found to be substantially reduced in vanadium; low vanadium contents are extremely desirable if the phosphates are to be used as supplements in animal feeds. It has been found that vanadium is removed in the desliming operation and that the resultant product is perfectly suitable for either fertilizer or animal feed use. In the defluorination operation, better than 99% of the fluorine has been removed.

It is advantageous to add a small quantity, e.g., from about 3 to about 8% of soda ash ($Na_2CO_3$) in the blender. This soda ash noticeably increases the rate of fluorine elimination. This is desirable in order to speed up the defluorination operation which can be as long as from 6 to 8 hours. In addition, the soda ash additive is advantageous in that it increases the citrate solubility of the resultant phosphate particle which is desirable in fertilizer applications.

The defluorinated compacted particles thus treated also are ideally suited for reduction in a phosphate furnace to recover elemental phosphorus. The lack of fluorine in the phosphatic particles materially decreases the degree of sintering which is obtained during the reduction of the phosphate to elemental phosphorus. Further, since these particles are hard and dust free, a minimum amount of phosphate values will be lost as dust in the kiln during the reduction operation.

In order to illustrate the present invention, the attached drawing is given to illustrate one mode for carrying out the instant invention, and is not limiting of the invention.

In the drawing, 2 represents a three-stage defluorination apparatus. The three stages are a preheat zone, a defluorination zone and a quench zone. In this defluorinator, air and fuel gas streams enter fluid bed 8, which constitutes the preheat zone through lines 12 and 6, respectively The air stream, which enters line 12, flows upward through the apertures 34 in support 36 and act as the fluidizing gas. The feed particles are introduced through conduit 4 and are heated in fluid bed 8 to a temperature of between 800° C. to about 1000° C. The temperature of the fluid bed preheater 8 should be below the temperature at which fluorine is liberated from the phosphatic feed, i.e., below about 1050° C. The gases coming off of fluid bed 8 are removed via conduit 32 as stack gas. The feed pellets, upon being heated to the desired temperature in preheating fluid bed 8, overflow into conduit 10 and enter a second fluid bed 14 which constitutes the defluorination zone. The phosphatic feed pellets are heated in fluid bed 14 to a temperature of from about 1050° C. to about 1500° C. to remove the fluoride values from the phosphatic feed pellets. The increased temperature of fluid bed 14 is maintained by passing preheated air 16 from fluid bed 22 upward through the apertures 34 in support 38 along with fuel which enters the bed through conduit 20. The preheated air which enters fluid bed 14 acts as the fluidizing gas for fluid bed 14. The hydrogen fluoride gas which is generated, along with $CO_2$, $H_2O$ and $N_2$, are removed through conduit 30. The defluorinated pellets overflow fluid bed 14 into conduit 18 and enter fluid bed 22 where they are quenched to a temperature of about 500° C. The fluid bed 22 is supported by a fluidizing gas made up of air, which enters through conduit 24. Water is introduced into the bed through conduit 26 to quench the hot defluorinated pellets. Simultaneously, the air and water in the gas stream are heated and vaporized, respectively. The preheated air and the steam, which are liberated from the fluidized bed 22, pass upward into defluorinating fluid bed 14 through openings 34 in support 38. The quenched defluorinated phosphatic pellets are removed by line 28 from fluid bed 22.

The defluorination which takes place within zone 14 can only take place if water, i.e., steam, is present within the defluorinating zone. The steam can be supplied by passing controlled amounts of water in contact with hot defluorinated particles in the quenching zone. The steam thus generated is passed into defluorinating zone 14 through openings 34 in support 38, along with heated air in order to carry out the defluorination of the phosphatic pellets. Steam is also supplied from the oxidized fuel gas by conversion of hydrogen to water.

The following examples are presented by way of illustration only and are not deemed to be limiting to the present invention.

*Example I*

Phosphatic rock from the Western United States containing 36.55% CaO, 25.15% $P_2O_5$, 23.68% $SiO_2$, 2.47% fluorine and minor amounts of $Al_2O_3$ was crushed to −10 mesh, and deslimed by repeated washing and settling in water until the colloidal slime particles were decanted and removed. The deslimed ore contained 45.18% CaO, 30.44% $P_2O_5$, 14.36% $SiO_2$ and 2.97% fluorine. Eighty parts of this deslimed rock, 20 parts of lime hydrate —$Ca(OH)_2$— and 5 parts of soda ash —$Na_2CO_3$— were finely ground to −150 mesh, dry blended and pelletized with water in a rolling drum. The resulting pellets were dried in a small rotary drier and were then screened to obtain a −10 +65 mesh fraction. The pellets had a free mole ratio of $CaO/SiO_2$ of 2.1:1 and contained 22.7% by weight $P_2O_5$ and 47.32% by weight CaO. A charge of 2268 grams of these pellets was treated in a laboratory fluid bed made up of tubing having a 4 inch I.D. and a length of 30 inches. The fluid bed tubing was positioned within an outer cylinder; the major heat requirement was supplied by burning methane within the annular space made up by the outer surface of the fluid bed tubing and the outer cylinder. A gas stream was passed upward through the bottom of the tubing to fluidize the bed. This gas stream contained air and methane which were introduced into the bed at rates of 3.28 s.c.f.m. and 0.28 s.c.f.m. The bed was heated gradually by external and internal combustion of methane until it reached about 1050° C. At this temperature, hydrogen fluoride began to be liberated from the fluid bed by reaction of the water of combustion with the phosphate pellets. The bed was maintained above 1050° C. for 420 minutes and rose to a temperature of about 1300° C. Thereafter, the fluid bed was shut down and the pellets permitted to cool. Upon analysis, the pellets showed that 99.7% of the fluoride had been eliminated. The citrate solubility of the defluorinated pellets was tested according to the Official Method of the Association of Official Agricultural Chemists (9th ed. 1960) and found to be 92–95% citrate soluble.

*Example II*

The following example was carried out in a rotary kiln.

A phosphate rock from the Western United States containing 36.55% CaO, 25.15% $P_2O_5$, 23.18% $SiO_2$, 2.47% fluorine and minor amounts of $Al_2O_3$ was deslimed by repeated washing and settling in water until the colloidal slime particles were decanted and removed in the same manner as Example I. One hundred parts of this deslimed rock, 83.4 parts of lime hydrate —$Ca(OH)_2$—, 24.4 parts of sand and 6.3 parts of soda ash —$Na_2CO_3$— were finely ground to −150 mesh, dry blended and pelletized with water in a rolling drum. The resulting pellets were dried in a small rotary drier and were then screened to obtain −10 +20 mesh pellets. The dried pellets, on analysis, were found to contain a free mole ratio of $CaO/SiO_2$ of 2.0:1, 14.47% by weight $P_2O_5$ and 48.31% by weight CaO. A charge of 5000 grams of the −10 +20 mesh pellets was placed in a pilot plant rotary kiln having a diameter of 28 inches and a length of 28 inches. The kiln was internally fired with an air-propane mixture. The kiln was rotated at a rate of 0.4 r.p.m. until a temperature of 1000° C. was reached. Thereafter, the kiln was rotated at 1 r.p.m. for the remainder of the run. The kiln was maintained at a temperature of above 1050° C. for about 381 minutes; hydrogen fluoride commenced being evolved at temperatures above about 1050° C. by reaction of the phosphatic pellets with the water of combustion. A final temperature of 1325° C. was reached. Thereafter, the kiln was shut down. Upon quenching of the defluorinated phosphatic pellets, it was determined that 99.9% of the fluorides were removed.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for defluorinating a phosphatic ore containing molecularly bound fluorides and silicon dioxide in amounts of at least 8% by weight which comprises
   (a) introducing said phosphatic ore having a particle size of about −10 mesh into a desliming classifier,
   (b) water washing −10 mesh phosphatic ore in a desliming classifier to remove small colloidal particles below about 5 microns containing low fusion point impurities as slimes from the phosphate-containing particles,
   (c) passing said deslimed phosphate-containing particles into a blender with sufficient amounts of silica and a compound containing calcium values to adjust the free $CaO/SiO_2$ mole ratio of said phosphatic ore to above about 1.70:1,
   (d) compacting said ore mixture to form discrete particles,
   (e) heating said compacted particles in a heating zone at a temperature of about 1050° C. to about 1450° C. in the presence of steam whereby said steam reacts with the molecularly bound fluoride to produce hydrogen fluoride,
   (f) volatilizing said hydrogen fluoride from said compacted particles, and
   (g) recovering said compacted particles substantially free of fluoride and in the form of discrete non-sintered particles.

2. Process of claim 1 in which the free $CaO/SiO_2$ mole ratio is above about 2.0:1.

3. Process of claim 1 in which the temperature is from 1250° C. to 1450° C.

4. Process of claim 1 in which the heating temperature is about 1300° C.

5. Process of claim 1 in which soda ash is added to said compacted ore mixture in amounts of about 3 to 8% by weight.

6. Process of claim 1 in which said compacted particles are about −6 +20 mesh.

7. Process of claim 1 in which said heating is carried out in a fluid bed.

8. Process of claim 1 in which said heating is carried out in a rotary kiln.

9. Process of claim 1 in which said hydrogen fluoride is recovered.

References Cited by the Examiner

UNITED STATES PATENTS

| | | | |
|---|---|---|---|
| 1,630,283 | 5/1927 | Waggaman et al. | 23—165 X |
| 1,870,602 | 8/1932 | Case | 23—165 X |
| 2,360,197 | 10/1944 | Butt | 23—108 X |
| 2,446,978 | 8/1948 | Maust | 71—47 |
| 2,478,200 | 8/1949 | Maust et al. | 23—108 X |

MAURICE A. BRINDISI, *Primary Examiner.*